US010507583B2

(12) United States Patent
Wang et al.

(10) Patent No.: US 10,507,583 B2
(45) Date of Patent: Dec. 17, 2019

(54) ROBOT CONTROL DEVICE

(71) Applicant: FANUC CORPORATION, Yamanashi (JP)

(72) Inventors: Kaimeng Wang, Yamanashi (JP); Wenjie Chen, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 121 days.

(21) Appl. No.: 15/676,503

(22) Filed: Aug. 14, 2017

(65) Prior Publication Data

US 2018/0050452 A1    Feb. 22, 2018

(30) Foreign Application Priority Data

Aug. 17, 2016    (JP) .................... 2016-159895

(51) Int. Cl.
*B25J 19/00*       (2006.01)
*B25J 9/16*        (2006.01)

(52) U.S. Cl.
CPC ... *B25J 9/1697* (2013.01); *G05B 2219/39391* (2013.01); *G05B 2219/40022* (2013.01); *G05B 2219/40565* (2013.01)

(58) Field of Classification Search
USPC .................................................. 700/245–264
See application file for complete search history.

(56) References Cited

U.S. PATENT DOCUMENTS 4,302,138 A  *  11/1981  Zarudiansky ............. B25J 3/04
                                                       414/5
4,575,297 A  *   3/1986  Richter ................. B25J 9/0006
                                                       414/5
(Continued)

FOREIGN PATENT DOCUMENTS

CN        103459102 A       12/2013
CN        103646391 A        3/2014
(Continued)

OTHER PUBLICATIONS

Japanese Office Action dated Sep. 4, 2018, for Japanese Patent Application No. 2016-159895.
(Continued)

*Primary Examiner* — Jonathan L Sample
(74) *Attorney, Agent, or Firm* — Karceski IP Law, PLLC (57) ABSTRACT

A robot control device includes a feature-point detecting unit that detects, from an image of an object acquired by a visual sensor, the positions of a plurality of feature points on the object in a predetermined cycle; a position/orientation calculating unit that updates, in the predetermined cycle, respective equations of motion of the plurality of feature points on the basis of the detected positions of the plurality of feature points and that calculates the position or orientation of the object on the basis of the detected positions of the plurality of feature points calculated from the updated equations of motion; and a robot-arm-movement control unit that controls the movement of a robot arm so as to follow the object, on the basis of the calculated position or orientation of the object.

6 Claims, 5 Drawing Sheets

(56) References Cited

U.S. PATENT DOCUMENTS

| | | | | |
|---|---|---|---|---|
| 4,623,183 | A * | 11/1986 | Aomori | B25J 15/103 294/106 |
| 4,783,107 | A * | 11/1988 | Parker | B25J 13/082 294/213 |
| 4,942,538 | A * | 7/1990 | Yuan | B25J 9/1689 348/95 |
| 4,957,320 | A * | 9/1990 | Ulrich | B25J 9/102 192/56.1 |
| 5,004,391 | A * | 4/1991 | Burdea | B25J 3/04 294/200 |
| 5,280,265 | A * | 1/1994 | Kramer | A61B 5/6806 128/925 |
| 5,437,490 | A * | 8/1995 | Mimura | B25J 9/102 294/106 |
| 5,501,498 | A * | 3/1996 | Ulrich | B25J 9/102 294/106 |
| 5,548,667 | A * | 8/1996 | Tu | G06K 9/6206 382/115 |
| 5,579,444 | A * | 11/1996 | Dalziel | B25J 9/1669 382/153 |
| 5,631,861 | A * | 5/1997 | Kramer | G06F 3/011 414/5 |
| 5,748,854 | A * | 5/1998 | Watanabe | G05B 19/423 318/568.16 |
| 5,967,580 | A * | 10/1999 | Rosheim | B25J 3/04 294/106 |
| 6,016,385 | A * | 1/2000 | Yee | B25J 3/04 700/245 |
| 6,042,555 | A * | 3/2000 | Kramer | A61B 5/225 600/595 |
| 6,044,183 | A * | 3/2000 | Pryor | A01B 69/008 382/287 |
| 6,249,718 | B1 * | 6/2001 | Gilliland | B25J 9/1671 219/130.4 |
| 6,278,906 | B1 * | 8/2001 | Piepmeier | B25J 9/1607 700/245 |
| 6,565,563 | B1 * | 5/2003 | Agee | A61B 17/6425 602/21 |
| 6,701,296 | B1 * | 3/2004 | Kramer | A61B 5/6806 370/545 |
| 6,924,787 | B2 * | 8/2005 | Kramer | G06F 3/016 345/156 |
| 7,313,464 | B1 * | 12/2007 | Perreault | B25J 9/1666 318/568.1 |
| 7,862,522 | B1 * | 1/2011 | Barclay | G06F 3/014 414/2 |
| 7,877,165 | B2 * | 1/2011 | Sugiyama | B62D 57/032 318/568.11 |
| 7,957,583 | B2 * | 6/2011 | Boca | B25J 9/1697 345/419 |
| 8,219,352 | B2 * | 7/2012 | Taguchi | B25J 9/1694 700/245 |
| 8,255,079 | B2 * | 8/2012 | Linn | B25J 9/0006 482/47 |
| 8,350,806 | B2 * | 1/2013 | Nagasaka | G06F 3/016 345/156 |
| 8,467,903 | B2 * | 6/2013 | Ihrke | B25J 9/104 700/245 |
| 8,483,880 | B2 * | 7/2013 | de la Rosa Tames | B25J 9/1045 600/595 |
| 9,030,674 | B2 * | 5/2015 | Bonin | B25J 9/1676 356/614 |
| 9,108,321 | B2 | 8/2015 | Emoto et al. | |
| 9,122,275 | B2 * | 9/2015 | Kim | G05D 3/00 |
| 9,321,176 | B1 * | 4/2016 | Sun | B25J 9/1612 |
| 9,333,648 | B2 * | 5/2016 | Kim | B25J 9/1612 |
| 9,383,895 | B1 * | 7/2016 | Vinayak | G06F 3/017 |
| 9,427,874 | B1 * | 8/2016 | Rublee | B25J 9/1697 |
| 9,492,923 | B2 * | 11/2016 | Wellman | B25J 9/1612 |
| 9,545,717 | B2 * | 1/2017 | Kim | B25J 9/1612 |
| 9,616,568 | B1 * | 4/2017 | Russell | B25J 19/02 |
| 9,669,543 | B1 * | 6/2017 | Stubbs | B25J 9/1612 |
| 9,868,212 | B1 * | 1/2018 | Hintertoisser | B25J 9/1671 |
| 10,131,051 | B1 * | 11/2018 | Goyal | B25J 9/1612 |
| 2004/0106916 | A1 * | 6/2004 | Quaid | G06F 3/0346 606/1 |
| 2004/0266276 | A1 * | 12/2004 | Hariki | B25J 9/1697 439/894 |
| 2007/0078564 | A1 * | 4/2007 | Hoshino | G06K 9/00362 700/245 |
| 2007/0152619 | A1 * | 7/2007 | Sugiyama | B25J 9/1612 318/568.12 |
| 2007/0282485 | A1 * | 12/2007 | Nagatsuka | B25J 9/1671 700/245 |
| 2008/0204425 | A1 * | 8/2008 | Nagasaka | G06F 3/016 345/173 |
| 2008/0240889 | A1 * | 10/2008 | Yokoyama | B25J 9/1612 414/1 |
| 2009/0285664 | A1 * | 11/2009 | Kim | B25J 9/1612 414/730 |
| 2009/0302626 | A1 * | 12/2009 | Dollar | B25J 9/104 294/106 |
| 2009/0306825 | A1 * | 12/2009 | Li | B25J 9/1669 700/261 |
| 2010/0010670 | A1 * | 1/2010 | Matsukuma | B25J 9/104 700/245 |
| 2010/0070246 | A1 * | 3/2010 | Choi | G06F 17/5009 703/2 |
| 2010/0098324 | A1 * | 4/2010 | Fujieda | B25J 9/1697 382/154 |
| 2010/0103106 | A1 * | 4/2010 | Chui | G06F 3/017 345/166 |
| 2010/0138039 | A1 * | 6/2010 | Moon | B25J 9/1612 700/245 |
| 2010/0176615 | A1 * | 7/2010 | Okuda | A61F 2/583 294/106 |
| 2010/0215257 | A1 * | 8/2010 | Dariush | G06K 9/00369 382/159 |
| 2010/0292837 | A1 * | 11/2010 | Takahashi | B25J 9/1612 700/245 |
| 2011/0118877 | A1 * | 5/2011 | Hwang | B25J 13/00 700/264 |
| 2011/0238213 | A1 * | 9/2011 | Nagasaka | B25J 9/1612 700/253 |
| 2011/0288681 | A1 * | 11/2011 | Hayakawa | B25J 15/0009 700/245 |
| 2012/0078419 | A1 * | 3/2012 | Kim | B25J 9/1669 700/255 |
| 2012/0123589 | A1 * | 5/2012 | Kim | B25J 9/1612 700/254 |
| 2013/0041502 | A1 * | 2/2013 | Shi | B25J 9/1612 700/245 |
| 2013/0057004 | A1 * | 3/2013 | Murata | B25J 15/0009 294/106 |
| 2013/0173055 | A1 * | 7/2013 | Kim | B25J 9/1612 700/245 |
| 2013/0238125 | A1 * | 9/2013 | Suzuki | B25J 9/1612 700/253 |
| 2013/0238129 | A1 * | 9/2013 | Rose | F04B 9/10 700/258 |
| 2013/0245828 | A1 * | 9/2013 | Tateno | B25J 9/1697 700/259 |
| 2013/0273968 | A1 * | 10/2013 | Rhoads | G06K 9/6253 455/556.1 |
| 2014/0012416 | A1 * | 1/2014 | Negishi | B25J 9/1607 700/251 |
| 2014/0067126 | A1 * | 3/2014 | Watanabe | B25J 9/1697 700/259 |
| 2014/0074291 | A1 * | 3/2014 | Emoto | B25J 9/1664 700/258 |
| 2014/0163731 | A1 * | 6/2014 | Shi | B25J 9/1633 700/250 |
| 2014/0226136 | A1 * | 8/2014 | Gagnon | G03F 1/82 355/30 |
| 2014/0293009 | A1 * | 10/2014 | Nakazato | G01B 11/26 348/46 |

(56) References Cited

U.S. PATENT DOCUMENTS

| | | | | |
|---|---|---|---|---|
| 2014/0371910 | A1* | 12/2014 | Hayashi | B25J 9/1697 700/259 |
| 2015/0019013 | A1* | 1/2015 | Rose | G01L 1/16 700/258 |
| 2015/0124057 | A1* | 5/2015 | Yamazaki | B25J 9/1697 348/46 |
| 2015/0290795 | A1* | 10/2015 | Oleynik | G05B 19/42 700/257 |
| 2015/0314452 | A1* | 11/2015 | Tateno | B25J 9/1697 700/259 |
| 2016/0058519 | A1* | 3/2016 | Herr | A61B 34/10 600/438 |
| 2016/0059412 | A1* | 3/2016 | Oleynik | B25J 9/163 700/257 |
| 2016/0155235 | A1* | 6/2016 | Miyatani | G06K 9/036 |
| 2016/0167227 | A1* | 6/2016 | Wellman | B25J 9/1612 700/259 |
| 2016/0167228 | A1* | 6/2016 | Wellman | B25J 9/1612 700/218 |
| 2016/0232654 | A1* | 8/2016 | Suzuki | B25J 9/1697 |
| 2017/0097232 | A1* | 4/2017 | Anderson-Sprecher | G05D 1/021 |

FOREIGN PATENT DOCUMENTS

| | | |
|---|---|---|
| CN | 104786226 A | 7/2015 |
| CN | 105740899 A | 7/2016 |
| EP | 2708334 A1 | 3/2014 |
| JP | 2002018754 A | 1/2002 |
| JP | 2002163639 A | 6/2002 |
| JP | 2003311674 A | 11/2003 |
| JP | 4265088 A | 5/2009 |
| JP | 2010515995 A | 5/2010 |
| JP | 2011143494 A | 7/2011 |
| JP | 2011161615 A | 8/2011 |
| JP | 2012236254 A | 12/2012 |
| JP | 2014161937 A | 9/2014 |
| JP | 2015000454 A | 1/2015 |
| JP | 2016103230 A | 6/2016 |

OTHER PUBLICATIONS

Japanese Search Report from Registered Search Organization dated Sep. 4, 2018, for Japanese Patent Application No. 2016-159895.

Yongxiang Fan, Hsien-Chung Lin, et al., "Object Position and Orientation Tracking for Manipulators Considering Nonnegligible Sensor Physics", Proceedings of ISFA2016, 2016 International Symposium on Flexible Automation, Aug. 1-3, 2016, Cleveland, Ohio, U.S.A.

"Kinematics—Inverse Kinematic Singularity, Redundancy", Centre for Robotics Research—School of Natural and Mathematical Sciences—King's College London, undated.

Japanese Decision to Grant a Patent dated Mar. 12, 2019, for Japanese Patent Application No. 2016-159895.

Chinese Office Action dated Jun. 5, 2019, for Chinese Patent Application No. 201710687596.0.

* cited by examiner

ROBOT CONTROL DEVICE

CROSS-REFERENCE TO RELATED APPLICATIONS

This application is based on and claims priority to Japanese Patent Application No. 2016-159895, filed on Aug. 17, 2016, the entire content of which is incorporated herein by reference.

FIELD OF THE INVENTION

The present invention relates to a robot control device suitable for controlling a robot arm through visual servoing.

BACKGROUND OF THE INVENTION

One conventional technique for controlling a robot arm is visual servoing in which the position and the orientation of a moving workpiece (object) are continuously measured by a visual sensor, such as a camera, and the robot arm is made to follow the object on the basis of the measurement results (for example, Publication of Japanese Patent No. 4265088 and Japanese Unexamined Patent Application, Publication No. 2011-143494).

SUMMARY OF THE INVENTION

According to a first aspect, the present invention provides a robot control device including: a feature-point detecting unit that detects, from an image of an object acquired by a visual sensor, the positions of a plurality of feature points on the object, in a predetermined cycle; a position/orientation calculating unit that updates, in the predetermined cycle, respective equations of motion of the plurality of feature points on the basis of the detected positions of the plurality of feature points and that calculates the position or orientation of the object on the basis of the positions of the plurality of feature points calculated from the updated equations of motion; and a robot-arm-movement control unit that controls the movement of a robot arm so as to follow the object, on the basis of the calculated position or orientation of the object.

DESCRIPTION OF EMBODIMENT(S)

A robot system according to an embodiment of the present invention will be described in detail below with reference to the drawings. Note that, in this specification, a hat disposed above an English character symbol is referred to as "(English character symbol)$^{hat}$" or "$\char$" a bar disposed above an English character symbol is referred to as "(English character symbol)$^{bar}$" or "$\bar{\ }$", and a dot disposed above an English character symbol is referred to as "(English character symbol)$^{dot}$" or "$\dot{\ }$".

Figure 1:
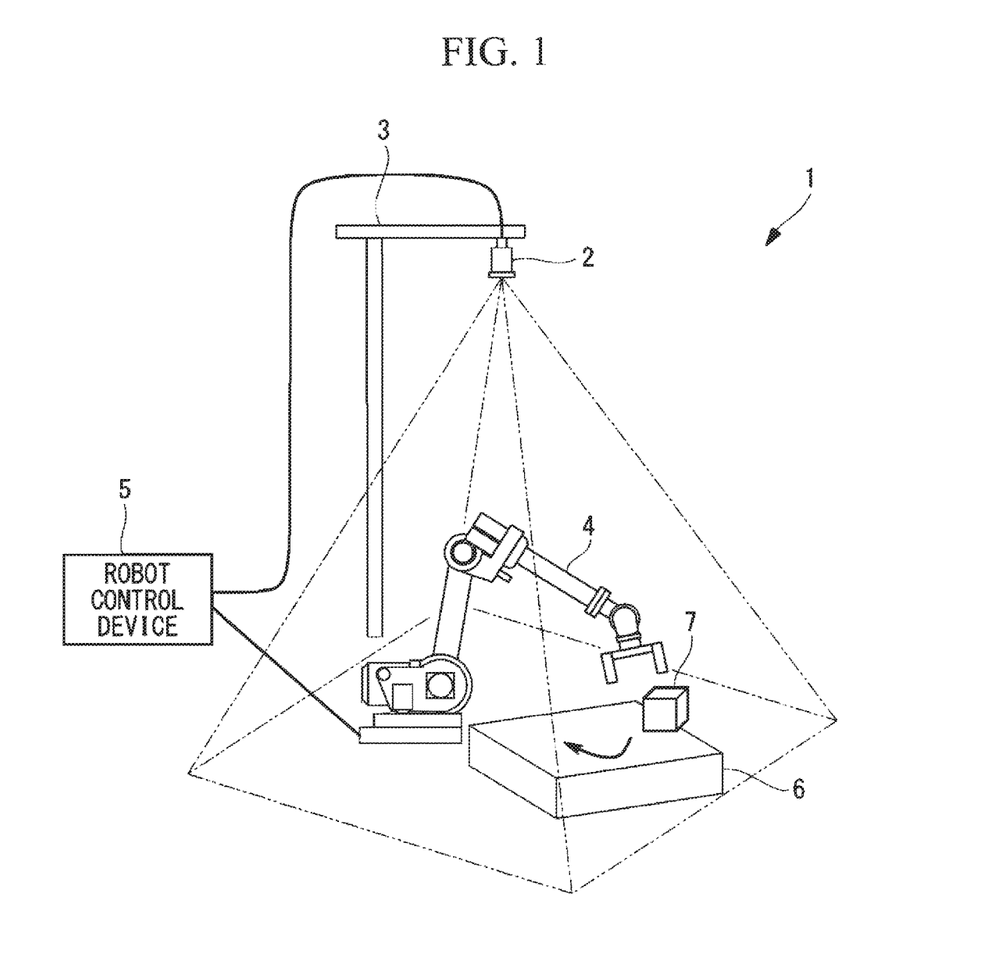
FIG. 1 is a view showing, in outline, the configuration of a robot system according to one embodiment of the present invention.

As shown in FIG. 1, a robot system 1 of this embodiment is provided with: a camera 2; a stand 3 that supports the camera 2; a robot arm 4; and a robot control device 5 to which the camera 2 and the robot arm 4 are connected. The robot control device 5 is configured to perform control through visual servoing such that the robot arm 4 follows the movement of a workpiece (object) 7 on the basis of visual information obtained from the camera 2.

The workpiece 7 is placed on a conveying device 6, such as a belt conveyor or a rotary table, and is moved according to the movement of the conveying device 6.

Note that, in this embodiment, although the camera 2 is supported by the stand 3, the position thereof is not limited thereto, and the camera 2 may be mounted on the robot arm 4.

The configuration of the robot control device 5, which is provided in the robot system 1, will be described in detail below with reference to FIG. 2. Note that the robot control device 5 is provided with a processor (not shown), and this processor is configured to perform processing in respective functional blocks shown in FIG. 2.

Figure 2:
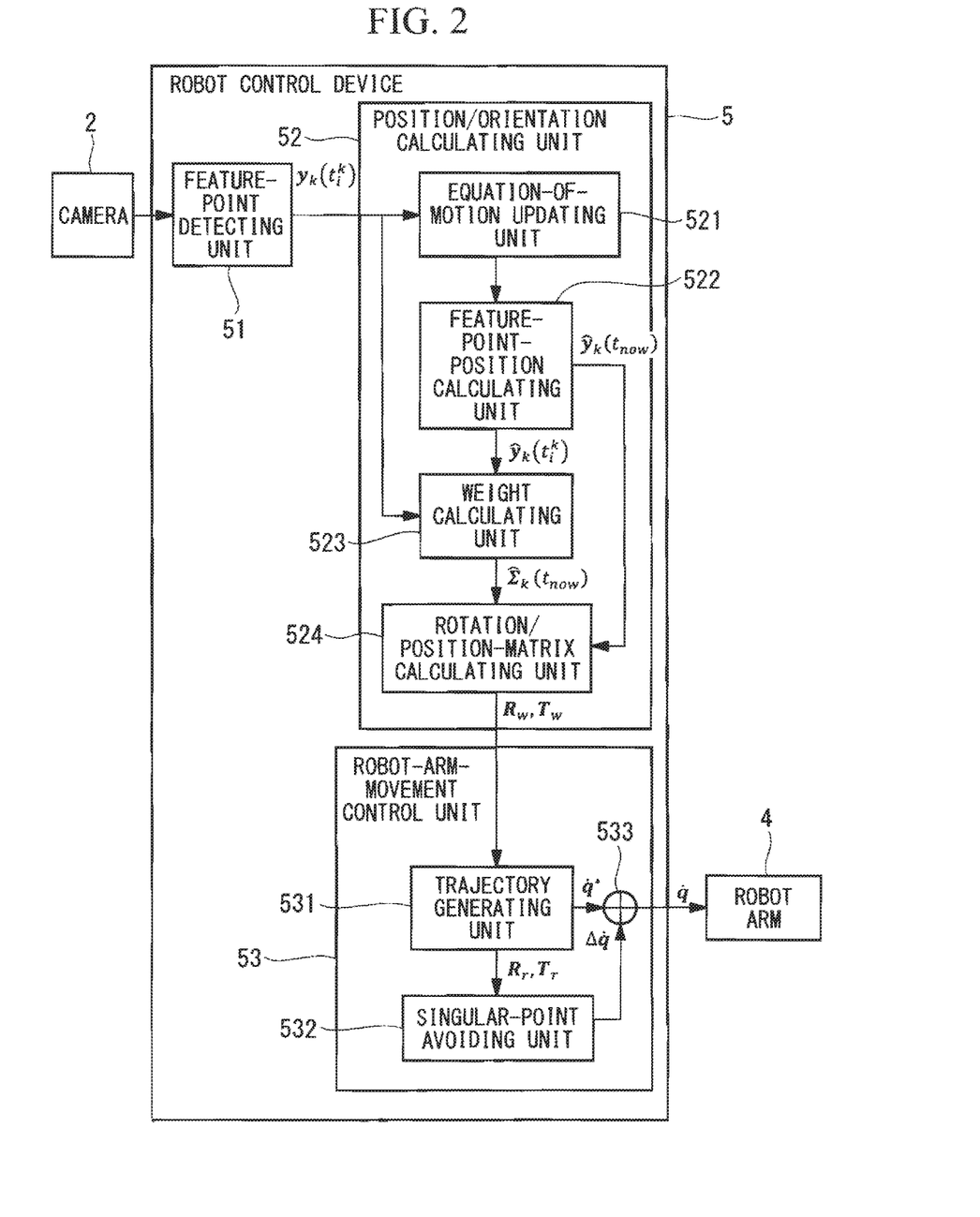
FIG. 2 is a block diagram of the robot system shown in FIG. 1.

As shown in FIG. 2, the robot control device 5 is provided with, as functional blocks, a feature-point detecting unit 51, a position/orientation calculating unit 52, and a robot-arm-movement control unit 53. The position/orientation calculating unit 52 is provided with, as functional blocks, an equation-of-motion updating unit 521, a feature-point-position calculating unit 522, a weight calculating unit 523, and a rotation/position-matrix calculating unit 524. The robot-arm-movement control unit 53 is provided with, as functional blocks, a trajectory generating unit 531, a singular-point avoiding unit 532, and an adding unit 533.

The feature-point detecting unit 51 is connected to the camera 2 and is connected to the equation-of-motion updating unit 521 and the weight calculating unit 523, which are provided in the position/orientation calculating unit 52. The equation-of-motion updating unit 521 is connected to the feature-point-position calculating unit 522. The feature-point-position calculating unit 522 is connected to the weight calculating unit 523 and the rotation/position-matrix calculating unit 524. The weight calculating unit 523 is connected to the rotation/position-matrix calculating unit 524.

The rotation/position-matrix calculating unit 524 is connected to the trajectory generating unit 531, which is provided in the robot-arm-movement control unit 53. The trajectory generating unit 531 is connected to the singular-point avoiding unit 532. The trajectory generating unit 531 and the singular-point avoiding unit 532 are connected to the adding unit 533. The adding unit 533 is connected to the robot arm 4.

The feature-point detecting unit 51 is configured to perform pattern matching using a preset shape with respect to an image that includes the workpiece 7 captured by the camera 2 and to detect the positions $y_k(t_i^k)$ of a plurality of feature points on the workpiece 7 in the image that matches this shape. Here, specifically, the detected position $y_k(t_i^k)$ expresses, for a k-th feature point, the position vector including x, y, and z directions at time $t_i^k$ at which the camera detects the workpiece.

The equation-of-motion updating unit 521 is configured to update the equation of motion of each feature point by using the position $y_k(t_i^k)$ of the feature point, which is detected by the feature-point detecting unit 51. The position of each feature point detected from the image acquired by the camera 2 can be expressed as in Equation (1) by using an equation of motion.

$$y_k(t_i^k) = f_k[y_k(t_{i-1}^k), t_i^k] + v_i^k \qquad (1)$$

Here, $fk[y_k(t_{i-1}^k), t_i^k]$ represents the equation of motion of each feature point, and $v_i^k$ represents sensor noise. Specifically, the position vector detected at the time $t_i^k$ is expressed on the basis of: an equation of motion that is updated by using the position $y_k(t_{i-1}^k)$ detected at time which is one cycle before; and the sensor noise.

Note that the equation of motion of each feature point can be expressed by Equation (2) and Equation (3), for example.

$$\dot{x}_k(t) = \begin{bmatrix} 0 & I_3 & 0 \\ 0 & 0 & I_3 \\ 0 & 0 & 0 \end{bmatrix} x_k(t) + \begin{bmatrix} 0 \\ 0 \\ I_3 \end{bmatrix} w(t) \qquad (2)$$

$$y_k(t) = [I_3 \ 0 \ 0] x_k(t) + v(t) \qquad (3)$$

Here, $x_k(t)$ represents the nine-dimensional vector including the position, the velocity, and the acceleration of each feature point at time t, w(t) represents an acceleration vector, which is a factor of velocity change at the feature point, and v(t) represents noise obtained at the time of detection using the camera.

More specifically, the equation-of-motion updating unit 521 calculates $y_k^{bar}(t_i^k)$ by the following Equation (4) and Equation (5), thereby updating each equation of motion.

$$\hat{y}_k(t_i^k) = f_k[\bar{y}_k(t_{i-1}^k), t_i^k] \qquad (4)$$

$$\bar{y}_k(t_i^k) = \hat{y}_k(t_i^k) + F_k(t_i^k)[y_k(t_i^k) - \hat{y}_k(t_i^k)] \qquad (5)$$

Here, $y_k^{hat}(t_i^k)$ is a calculated value obtained by using the equation of motion updated, at the time $t_i^k$, by using the position $y_k^{bar}(t_{i-1}^k)$ at the time $t_{i-1}^k$, which is one cycle before. Furthermore, $y_k^{bar}(t_i K)$ in Equation (5) represents the position of each feature point, calculated in consideration of both the detected value $y_k(t_i^k)$, which is detected by the camera 2 at the time $t_i^k$, and the calculated value $y_k^{hat}(t_i^k)$, which is calculated by using Equation (4). Note that, in Equation (5), $F_k(t_i^k)$ represents a gain of the difference between $y_k(t_i^k)$ and $y_k^{hat}(t_i^k)$.

The feature-point-position calculating unit 522 is configured to calculate the position $y_k^{hat}(t_{now})$ of each feature point at the current time $t_{now}$, as in Equation (6), by using the equation of motion updated by using the position $y_k^{bar}(t_i^k)$ at the time tik, which is calculated as described above.

$$\hat{y}_k(t_{now}) = f_k[\bar{y}_k(t_i^k), t_{now}] \qquad (6)$$

The weight calculating unit 523 is configured to calculate a weight for each feature point. Specifically, the weight calculating unit 523 calculates, as the weight for each feature point, the covariance $\Sigma_k^{hat}(t_{now})$ of the position of the feature point at the current time $t_{now}$, as shown in Equation (7), such that the importance of a feature point becomes higher as the feature point is detected a larger number of times (higher frequency) by the camera 2.

$$\hat{\Sigma}_k(t_{now}) = g_k[\Sigma_k(t_i^k), t_{now}] \qquad (7)$$

Here, $g_k$ is the result obtained after calculating the covariance for an equation of motion $f_k$, as shown in Equation (8).

$$g_k = \text{Cov}(f_k) \qquad (8)$$

Furthermore, $\Sigma_k^{bar}(t_i^k)$ is the covariance calculated in consideration of both the covariance of the detected value $y(t_i^k)$ detected by the camera 2 at the time $t_i^k$, and the covariance of the calculated value $y_k^{hat}(t_i^k)$ calculated by the equation of motion.

Note that, if there is a feature point that cannot be detected, the position of that feature point is calculated by using information obtained when the feature point was detected in the previous cycle.

The rotation/position-matrix calculating unit 524 is configured to use the covariance $\Sigma_k^{hat}(t_{now})$, which is calculated by the weight calculating unit 523, and the position $y_k^{hat}(t_{now})$ of the feature point, which is calculated by the feature-point-position calculating unit 522, to calculate, by Equation (9), a rotation matrix and a position matrix of the workpiece 7, in which each feature point is weighted.

$$\{R_w, T_w\} = \text{argmin}_{R_w, T_W} \sum_{k=1}^{n} (\hat{y}_k - R_w s_k - T_w)^T (\hat{\Sigma}_k)^{-1} (\hat{y}_k - R_w s_k - T_w) \qquad (9)$$

Here, $R_w$ represents the rotation matrix of the workpiece 7 in the robot-world coordinate system, $T_w$ represents the position matrix of the workpiece 7 in the robot-world coordinate system, and $s_k$ represents the position (vector including the x, y, and z directions) of a feature point, viewed from the object coordinate system fixed to the workpiece 7. However, if there is a feature point that is not detected, the result obtained when the feature point was detected in the previous cycle is used as the position of the feature point.

The trajectory generating unit 531 is configured to generate a trajectory of the robot arm 4. Specifically, the trajectory generating unit 531 calculates the differences between: the position and the orientation (a rotation matrix Rr and a position matrix $T_r$) of the current TCP generated by the robot-arm-movement control unit 53; and the position and the orientation (the rotation matrix $R_w$ and the position matrix $T_w$) of the workpiece 7 that were calculated by the position/orientation calculating unit 52, and multiplies these differences by the inverse of the Jacobian (the inverse matrix of the Jacobian), thereby calculating the differences for each axis angle, i.e., a command velocity $q^{dot*}$ for the robot arm 4.

$$\dot{q}^* = IK(\Delta R, \Delta T) = J^+(q) h(\Delta R, \Delta T) \qquad (10)$$

Here, $J^+$ is the inverse of the Jacobian transformation between axis positions and perpendicular positions. h($\Delta R$, $\Delta T$) is a function indicating that the differences $\Delta R$ and $\Delta T$ of the position and the orientation are multiplied by a proportional gain, and the proportional gain is adjusted according to the movement frequency of the workpiece 7 to be followed.

The singular-point avoiding unit 532 is configured to generate an interpolation velocity $\Delta q^{dot}$ for an avoidance movement by Equation (11) when the current TCP generated by the robot-arm-movement control unit 53 is close to a singular point.

$$\Delta \dot{q} = (I - J^+(q) J(q)) p(q) \qquad (11)$$

Here, p(q) is a function for correcting the velocity and is a correction velocity for each axis. The correction velocity p(q) for each axis can be obtained from Equation (12) and Equation (13).

$$H(q) = \sqrt{\det(J(q)J^T(q))} \quad (12)$$

$$p(q) = \lambda_0 \left(\frac{\partial H(q)}{\partial q}\right)^T \quad (13)$$

H(q) is an expression indicating robot manipulability (manipulability). As shown in Equation (13), the correction velocity p(q) for each axis is calculated from partial differentiation of H(q).

In the above-described Equation (13), $\lambda_0$ represents the proportional gain for avoiding a singular point. Note that the proportional gain $\lambda_0$ becomes 0 when the position and the orientation of the TCP are not close to a singular point, and the value of $\lambda_0$ is increased when the position and the orientation of the TCP are close to a singular point.

The adding unit 533 is configured to add the command velocity $q^{dot*}$ which is generated by the trajectory generating unit 531, and the interpolation velocity $\Delta q^{dot*}$, which is calculated by the singular-point avoiding unit, to calculate an each-axis velocity command $q^{dot}$ for the robot arm 4.

$$\dot{q} = \dot{q}^* + \Delta \dot{q} \quad (14)$$

The robot arm 4 is controlled according to the calculated each-axis velocity command $q^{dot}$.

Figure 3:
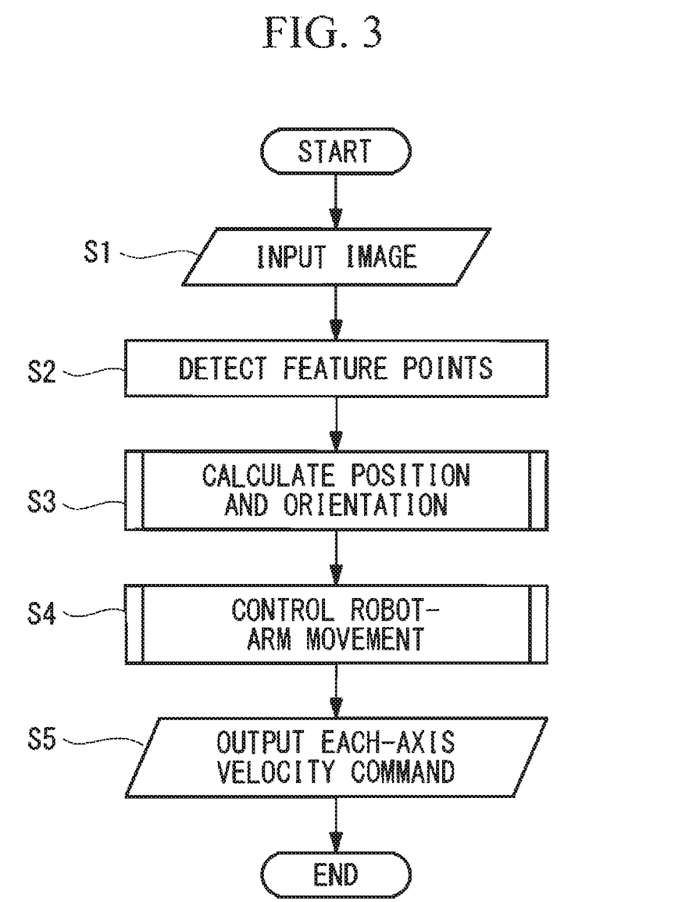
FIG. 3 is a flowchart showing processing performed in a robot control device shown in FIG. 2.
Figure 4:
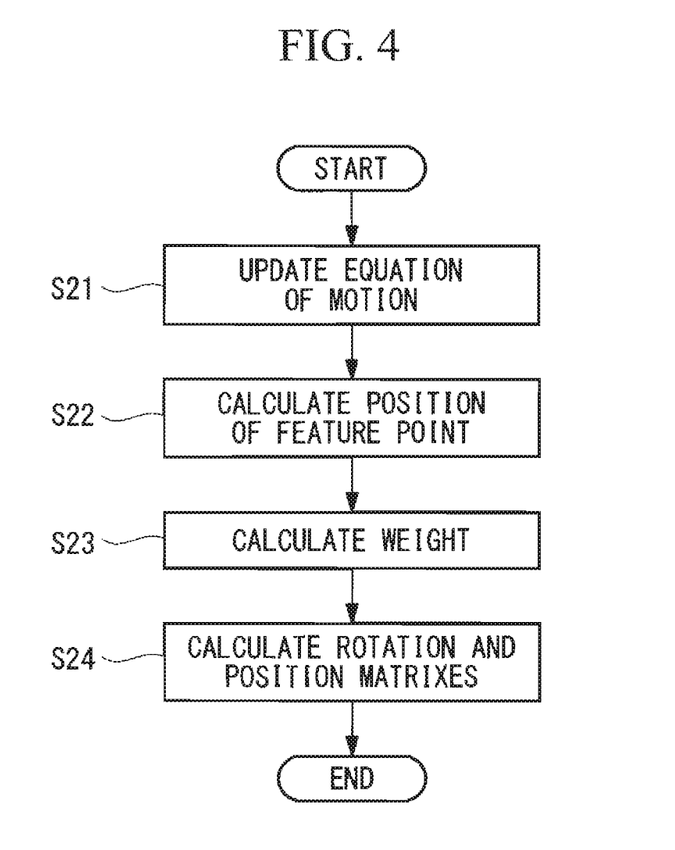
FIG. 4 is a flowchart showing processing performed in a position/orientation calculating unit shown in FIG. 2.
Figure 5:
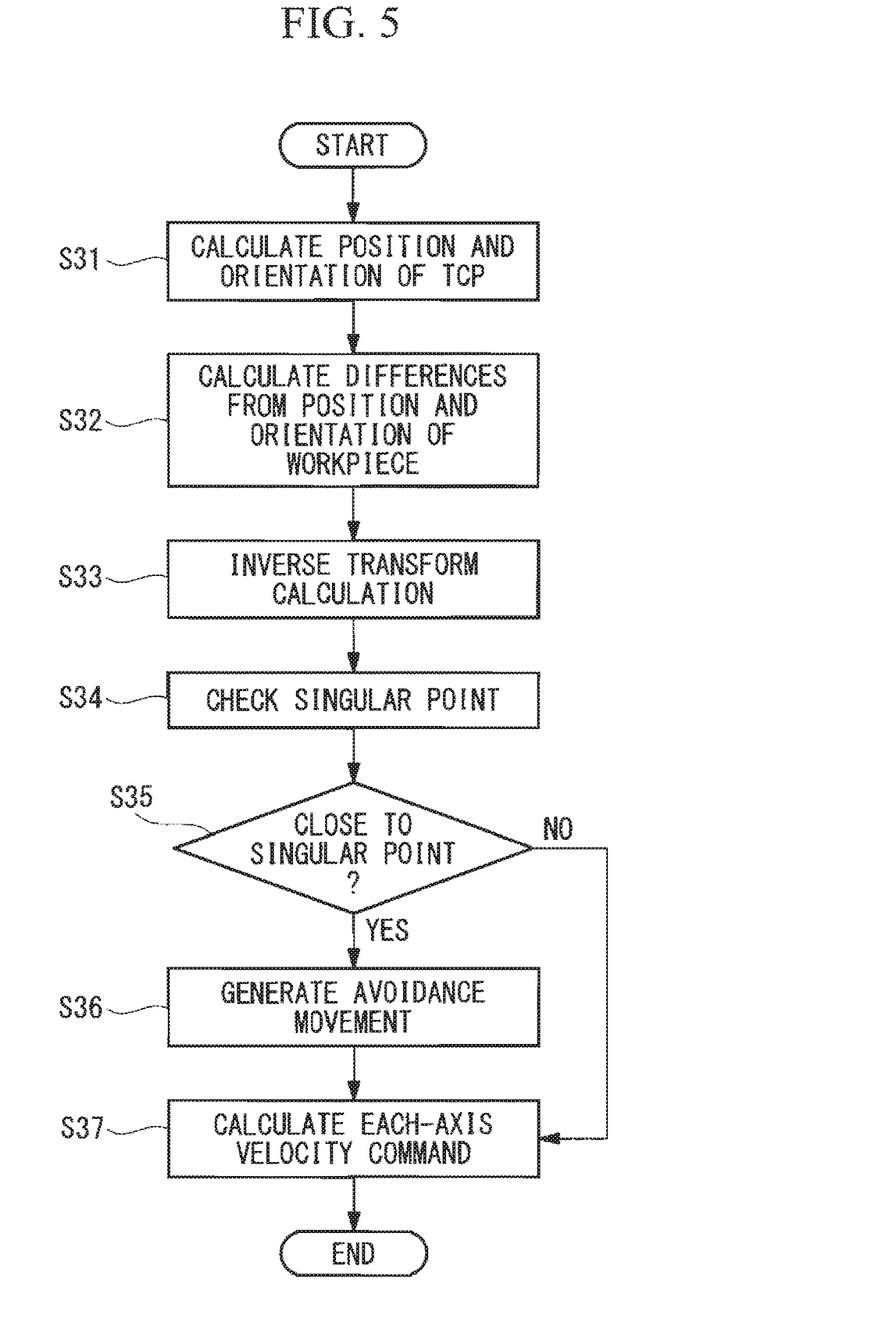
FIG. 5 is a flowchart showing processing performed in a robot-arm-movement control unit shown in FIG. 2.

The operation of the robot control device 5, which has the above-described configuration, will be described below with reference to FIGS. 3 to 5. FIGS. 3 to 5 show processing that the processor (not shown) provided in the robot control device 5 executes for each predetermined cycle, i.e., for each interpolation cycle of the robot arm 4.

First, an image acquired by the camera 2 is input to the robot control device 5 (Step S1 in FIG. 3). Then, the feature-point detecting unit 51 detects, from the image input to the robot control device 5, the positions of a plurality of feature points on the workpiece 7 (Step S2 in FIG. 3). Next, the position/orientation calculating unit 52 calculates the position and the orientation of the workpiece 7 on the basis of the detected positions of the plurality of feature points on the workpiece 7 (Step S3 in FIG. 3). Thereafter, in the robot-arm-movement control unit 53, a velocity command for each axis of the robot arm 4 is generated on the basis of the position and the orientation of the workpiece 7, which are calculated by the position/orientation calculating unit 52 (Step S4 in FIG. 3) and is output to the robot arm 4 (Step S5 in FIG. 3).

Next, the processing for calculating the position and the orientation of the workpiece 7, which is performed in Step S3 in FIG. 3, will be described with reference to FIG. 4.

First, the equation-of-motion updating unit 521 calculates the actual position $y_k^{bar}(t_i^k)$ of each feature point at the time $t_i^k$, which is obtained on the basis of: the detected position $y_k(t_i^k)$ of the feature point, which is detected at the time $t_i^k$ by the feature-point detecting unit 51; and the calculated position $y_k^{hat}(t_i^k)$ of the feature point at the time $t_i^k$, which is calculated from the equation of motion updated at the time $t_{i-1}^k$ (see Equation (4) and Equation (5)). Then, the calculated actual position $y_k^{bar}(t_i^k)$ is used to update the equation of motion (Step S21 in FIG. 4).

Then, the feature-point-position calculating unit 522 calculates the position $y_k^{hat}(t_{now})$ of the feature point at the current time $t_{now}$ by using the updated equation of motion, as shown in Equation (6) (Step S22 in FIG. 4).

In this way, because the equation of motion is updated for each interpolation cycle of the robot arm 4, even when the workpiece 7 randomly moves, it is possible to accurately calculate the current position of the workpiece 7.

Next, the weight calculating unit 523 calculates the covariance $\Sigma_k^{hat}(t_{now})$ of the position $y_k^{hat}(t_{now})$ of the feature point at the current time $t_{now}$ by Equation (7) on the basis of both the covariance of the detected position $y_k(t_i^k)$ of the feature point, which is detected at the time $t_i^k$ by the feature-point detecting unit 51, and the covariance of the calculated position $y_k^{hat}(t_i^k)$ of the feature point at the time $t_i^k$, which is calculated from the equation of motion updated at the time $t_{i-1}^k$ (Step S23).

Then, the rotation/position-matrix calculating unit 524 calculates a rotation matrix $R_w$ and a position matrix $T_w$ of the workpiece 7 by Equation (9) by using the covariance $\Sigma_k^{hat}(t_{now})$, which is calculated by the weight calculating unit 523 and which serves as a weight, and the position $y_k^{hat}(t_{now})$ of the feature point, calculated by the feature-point-position calculating unit 522 (Step S24 in FIG. 4).

In this way, because each feature point is weighted such that the importance of a feature point becomes higher as the feature point is detected a larger number of times by the camera 2, even if part of the workpiece 7 is blocked by obstacle or the like, for example, and thus, there is a feature point that cannot be detected, the robot arm 4 can be made to precisely follow the workpiece 7.

Next robot-arm-movement control processing performed in Step S4 of FIG. 3 will be described with reference to FIG. 5.

First, the trajectory generating unit 531 calculates the position and the orientation (the rotation matrix Rr and the position matrix $T_r$) of the TCP of the robot arm 4 (Step S31 in FIG. 5). Then, the differences $\Delta R$ and $\Delta T$ from the rotation matrix $R_w$ and the position matrix $T_w$ of the workpiece 7, i.e., the position and the orientation of the workpiece 7, which are calculated by the position/orientation calculating unit 52, are calculated (Step S32 in FIG. 5). From the differences $\Delta R$ and $\Delta T$, the command velocity $q^{dot*}$ for each axis of the robot arm 4 is calculated through inverse transform calculation by Equation (10), and the trajectory is generated (Step S33 in FIG. 5).

Next, the singular-point avoiding unit 532 checks whether the position and the orientation of the TCP of the robot arm 4, which are calculated by the trajectory generating unit 531, are close to a singular point (Step S34 in FIG. 5). Only if the position and the orientation of the TCP are close to a singular point, avoidance movement is generated, and if the position and the orientation of the TCP are not close to a singular point, the next processing is performed without generating avoidance movement (Step S35 in FIG. 5). Specifically, in Step S36, an interpolation velocity $\Delta q^{dot}$ of the avoidance movement is generated by Equations (11) to (13).

Finally, the command velocity $q^{dot*}$ for each axis, which is generated by the trajectory generating unit 531, and the interpolation velocity $\Delta q^{dot}$, which is generated by the singular-point avoiding unit 532, are added to calculate a velocity command for each axis of the TCP of the robot arm 4 (Step S37 in FIG. 5).

By doing so, a singular point can be avoided.

Although the embodiment of the present invention has been described above in detail with reference to the drawings, the specific configurations are not limited to those in the embodiment, and design changes etc. that do not depart from the scope of the present invention are also encompassed.

As a result, the above-described embodiment leads to the following aspect.

According to a first aspect, the present invention provides a robot control device including: a feature-point detecting unit that detects, from an image of an object acquired by a visual sensor, the positions of a plurality of feature points on the object, in a predetermined cycle; a position/orientation calculating unit that updates, in the predetermined cycle, respective equations of motion of the plurality of feature points on the basis of the detected positions of the plurality of feature points and that calculates the position or orientation of the object on the basis of the positions of the plurality of feature points calculated from the updated equations of motion; and a robot-arm-movement control unit that controls the movement of a robot arm so as to follow the object, on the basis of the calculated position or orientation of the object.

According to the robot control device of the above-described first aspect, the feature-point detecting unit detects, from an image of an object acquired by the visual sensor, the positions of a plurality of feature points on the object in a predetermined cycle. Next, the position/orientation calculating unit updates, in the predetermined cycle, equations of motion of the plurality of feature points on the basis of the positions of the plurality of feature points detected by the feature-point detecting unit. Furthermore, the position/orientation calculating unit calculates anew the positions of the plurality of feature points from the updated equations of motion and calculates the position or orientation of the object on the basis of the calculated positions of the plurality of feature points. Then, the robot-arm-movement control unit controls the robot arm so as to follow the object, on the basis of the position or orientation of the object calculated by the position/orientation calculating unit.

In this way, because the equation of motion of each feature point is updated in the predetermined cycle, building of an equation of motion of an object is enabled online. As a result, the robot arm can be made to follow an object that moves randomly, with high accuracy.

In the above-described robot control device, the position/orientation calculating unit may weight the plurality of feature points on the object on the basis of the frequencies of detection of the plurality of feature points.

By doing so, even if part of the plurality of feature points is blocked by obstacle or the like, and thus, the position or orientation of the object cannot be directly detected by a visual sensor, the position of each feature point calculated from the equation of motion and the position of each feature point that can be detected by the visual sensor are weighted on the basis of the frequencies of detection to calculate the position of the object, thereby making it possible to make the robot arm accurately follow the object.

In the above-described robot control device, the robot-arm-movement control unit may be provided with a singular-point avoiding unit that avoids a singular point of the robot arm.

With this configuration, a singular point can be avoided, thus making it possible to avoid an operational problem, such as abnormally fast rotation of a particular joint in the robot arm.

According to the present invention, an advantageous effect is afforded in that the robot arm can be made to accurately follow a workpiece that randomly moves.

The invention claimed is:

1. A robot control device, comprising:
a feature-point detecting unit that detects, from an image of an object acquired by a visual sensor, the positions of a plurality of feature points on the object, in multiple times in a predetermined cycle;
a position/orientation calculating unit that updates, in the predetermined cycle, respective equations of motion of the plurality of feature points based on the positions of the plurality of feature points detected in multiple times and that calculates the position or orientation of the object based on the detected positions of the plurality of feature points calculated from the updated equations of motion; and
a robot-arm-movement control unit that controls the movement of a robot arm so as to follow the object, based on the calculated position or orientation of the object.

2. A robot control device according to claim 1, wherein the position/orientation calculating unit weights the plurality of feature points on the object based on the frequencies of detection of the plurality of feature points.

3. A robot control device according to claim 1, wherein the robot-arm-movement control unit is provided with a singular-point avoiding unit that avoids a singular point of the robot arm.

4. A robot control device comprising:
a processor comprising hardware, the processor configured to:
detect from an image acquired by a visual sensor, the positions of a plurality of feature points on the object, in multiple times in a predetermined cycle;
update in the predetermined cycle, respective equations of motion of the plurality of feature points based on the positions of the plurality of feature points detected in multiple times and that calculate the position or orientation of the object based on the positions of the plurality of feature points calculated from the updated equations of motion; and
control the movement of a robot arm so as to follow the object, based on the calculated position or orientation of the object.

5. A robot control device according to claim 1, wherein the calculating of the position or orientation of the object weights the plurality of feature points on the object based on the frequencies of detection of the plurality of feature points.

6. A robot control device according to claim 1, wherein the controlling of the movement of the robot arm comprises avoiding a singular point of the robot arm.

* * * * *